(12) United States Patent
Cho et al.

(10) Patent No.: US 7,352,662 B2
(45) Date of Patent: Apr. 1, 2008

(54) MOLDED COIL DEVICE FOR ACTUATOR OF DISC DRIVE

(75) Inventors: Won-Ik Cho, Seoul (KR); Byung-Ryul Ryoo, Suwon-si (KR); Jong-Ha Jun, Suwon-si (KR); Dae-Jong Jang, Anyang-si (KR); Hyung-Joo Kang, Seoul (KR); Byung-Youn Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 10/842,829

(22) Filed: May 11, 2004

(65) Prior Publication Data

US 2004/0252596 A1 Dec. 16, 2004

(30) Foreign Application Priority Data

Jun. 13, 2003 (KR) ................. 10-2003-0038322
Sep. 24, 2003 (KR) ................. 10-2003-0066324

(51) Int. Cl.
*G11B 7/00* (2006.01)

(52) U.S. Cl. ................. 369/44.12; 369/44.14

(58) Field of Classification Search ............ 369/44.12, 369/44.14, 44.15, 44.2, 44.21, 44.11
See application file for complete search history.

(56) References Cited

U.S. PATENT DOCUMENTS 5,734,528 A * 3/1998 Jabbari et al. ............. 360/265

OTHER PUBLICATIONS

Japanese Patent No. JP2000339723 to Tomomi, having publication date of Dec. 8, 2000 (w/ English Abstract page).
Japanese Patent Application No. 09-000855 to Shigeyuki, having publication date of Jul. 31, 1998 (w/ English Abstract page).
Korean Patent Application No. 1019950045690 to Ahn, having Application date of Nov. 30, 1995 (w/ English Abstract page).
Korean Patent Application No. 1019950046425 to Ahn, having Application date of Dec. 4, 1995 (w/ English Abstract page).

* cited by examiner

*Primary Examiner*—Nabil Hindi
(74) *Attorney, Agent, or Firm*—Monica H. Choi

(57) ABSTRACT

A molded coil device includes a coil comprised of a plurality of turns of a conductive material through a plurality of planes and an integral body comprised of an insulating and nonmagnetic material burying the coil. The coil is first formed and thereafter is sintered/pressed with the insulating and nonmagnetic material to form the integral body. The molded coil device is advantageously applied within an optical pickup actuator of an optical disc drive.

18 Claims, 15 Drawing Sheets

MOLDED COIL DEVICE FOR ACTUATOR OF DISC DRIVE

BACKGROUND OF THE INVENTION

This application claims priority to Korean Patent Application Nos. 2003-0038322, filed on Jun. 13, 2003, and 2003-0066324, filed on Sep. 24, 2003, in the Korean Intellectual Property Office, the disclosures of which are incorporated herein in their entirety by reference.

1. Field of the Invention

The present invention relates generally to disc drives such as an optical disc drive, and more particularly, to a molded coil device for an actuator of disc drives for inducing an electromagnetic force upon interaction with a magnet.

2. Description of the Related Art

Typically, optical disc drives are devices which write or read information by radiating light on an optical disc, i.e., a recording medium. To this end, optical disc drives include a spindle motor which rotates an optical disc, and an optical pickup unit which performs write and reproduction operations by radiating light on a recording surface of the optical disc.

In general, the optical pickup unit includes an optical pickup actuator, which controls the position of an objective lens in focusing and tracking directions so that the focused light is formed on a desired track of the recording surface of the optical disc. The optical pickup actuator controls the objective lens to adjust a predetermined distance between the objective lens and the recording surface of the optical disc, for maintaining the focus of light spot(s) and for making the light spot(s) follow a desired track.

In order to perform precise write and reproduction operations, a function for dynamically adjusting tilt of the objective lens is also needed. Light emitted through the objective lens should be vertically incident on the recording surface of the optical disc so that light spot(s) having a precise focus is formed. If an incident direction of light is offset, precise light spot(s) cannot be formed on the optical disc. As such, errors may occur when writing and reproducing data. Adjustment for vertical incidence of light on the recording surface of the optical disc is referred to as tilt adjustment or skew adjustment. The optical pickup actuator may further include a mechanism for such tilt adjustment of the objective lens.

In the optical pickup actuator, coils are installed in a blade on which an objective lens is mounted. Magnets are installed in a base by which the blade is elastically and movably supported with the magnets facing the coils. When current flows through windings of a coil, an electromagnetic force is generated on the blade with the coil from the magnetic field of the magnets. The level of the electromagnetic force F is calculated by Lorentz's formula, $F=BL \times i$, where B is the intensity of the magnetic field, L is the effective length of the coil, and i is the level of current flowing through the coil. A plurality of coils and magnets are disposed at appropriate positions so that the blade may be moved in the focusing direction, the tracking direction, and the tilting direction.

A coil used in the optical pickup actuator is conventionally a wire-wound coil. Prior art methods of forming a conventional wire-wound coil in a blade of an optical pickup include a bobbin wire-winding method and an alignment wire-winding method. In the bobbin wire-winding method, a wire is wound directly around a bobbin placed on the blade. In the alignment wire-winding method, a wire is wound around a separate bobbin, the bobbin is removed, and only the wound wire is installed on the blade.

Corner parts of the wire-wound coil tend to be wound around on a rectangular bobbin. Thus, in such corner parts, direction of the current is not perpendicular to the direction of the magnetic field. As the number of turns of the coils increases, adverse effect on the resulting electromagnetic field from such misalignment becomes significant. The number of turns of a wire-wound coil is desired to be maximized to maximize the effective length of the coil. However, the thickness of the wire is limiting to the possible number of turns. In addition, with increased number of turns of the wire, the size and weight of the coil is increased such that the driving sensitivity of the optical pickup actuator may be disadvantageously lowered. In addition, since the wound wire of the coil is exposed to the outside, when such an exposed coil contacts a yoke or any other conductive material during driving, the coil may be damaged and short-circuited.

Alternatively in the prior art, a flat coil is patterned on a printed circuit board (PCB). However, since the PCB is manufactured using a conventional method, even though the PCB is formed of multiple layers, the number of layers is limited to about 8 layers such that there is a limitation in increasing the number of turns of the coil. In addition, because portions of a flat coil may be exposed, the flat coil may come off from the PCB. Furthermore, a flat coil tends to have good low-frequency characteristics and bad high frequency characteristics.

As known from Lorentz's formula, the magnetic field of a magnet is desired to be perpendicular to the current of a coil. Since magnetic flux is bent farther from the magnet, the magnet and the coil are desired to be disposed as close as possible. On the other hand with such close disposition, the driving range of the blade is limited by interference between the coil and the magnet.

In addition, in order to make the magnetic flux linear, a yoke is typically installed in the base to face the magnet. For enhanced magnetic efficiency, it is preferable that the yoke be installed as close as possible to the coil. On the other hand with such close installation, the driving range of the blade is limited. Further, due to errors during assembling of the yoke and coil, the yoke and coil may interfere with each other to limit the driving range of the blade. In addition, the number of turns of a wire-wound coil is limited by the desired range of size and weight of the coil and from restrictions resulting from rounded corners of such a coil. As a result, increasing the effective length of the wire-wound coil or the flat coil patterned on a PCB for inducing an electromagnetic force is difficult.

Thus, a new type of coil is desired without such disadvantages of the prior art.

SUMMARY OF THE INVENTION

Accordingly, in an aspect of the present invention, a molded coil device has an improved structure with a maximized number of turns for a minimized size of the coil.

The effective length of such a molded coil device for inducing an electromagnetic force is increased. In addition with such a molded coil device, damage caused by contact of the conductive turns with the outside or by shock is prevented. Furthermore with such a molded coil device, restriction of driving range of the coil caused by interference between a magnet and the coil or between the coil and a yoke is alleviated. Also usage of such a molded coil device for an actuator of a disc drive results in enhanced magnetic efficiency.

In a general aspect of the present invention, a molded coil device includes at least one coil comprised of a plurality of turns of a conductive material through a plurality of planes. In addition, the molded coil device includes an integral body comprised of an insulating and nonmagnetic material burying the plurality of turns of the at least one coil.

In another embodiment of the present invention, the molded coil device is formed with a plurality of coils, each having a plurality of turns of the conductive material that are buried within the integral body.

In a further aspect of the present invention, the molded coil device includes at least one yoke buried within the integral body. In that case, the yoke may be any of a stack yoke, a loop yoke, or an inner yoke.

In another embodiment of the present invention, the molded coil device is of a chip inductor-type formed from a plurality of stacked insulating sheets each having a conductive pattern and via holes. In that case, the conductive patterns of adjacent insulating sheets are coupled using the via holes such that the coupled conductive patterns form the coil, and the plurality of sheets are formed into the integral body.

Alternatively, the molded coil device is of a chip bead-type formed from a wire being wound around a base, and from the wound wire being sintered/pressed with the insulating and nonmagnetic material to form the integral body.

In another embodiment of the present invention, the molded coil device is of a chip bead-type formed from a conductive material being patterned into a spiral shape around a base using a CVD (chemical vapor deposition) process. In that case, the patterned conductive material and the base are sintered/pressed with the insulating and non-magnetic material to form the integral body.

The molded coil device may be applied to particular advantage when formed as part of an optical pickup actuator within an optical disc drive for at least one of focusing, tilting, and tracking adjustments of an objective lens.

BRIEF DESCRIPTION OF THE DRAWINGS

The above and other features and advantages of the present invention will become more apparent by describing in detail exemplary embodiments thereof with reference to the attached drawings in which.

The figures referred to herein are drawn for clarity of illustration and are not necessarily drawn to scale. Elements having the same reference number in FIGS. 1-19 refer to elements having similar structure and/or function.

DETAILED DESCRIPTION OF THE INVENTION

Figure 1:
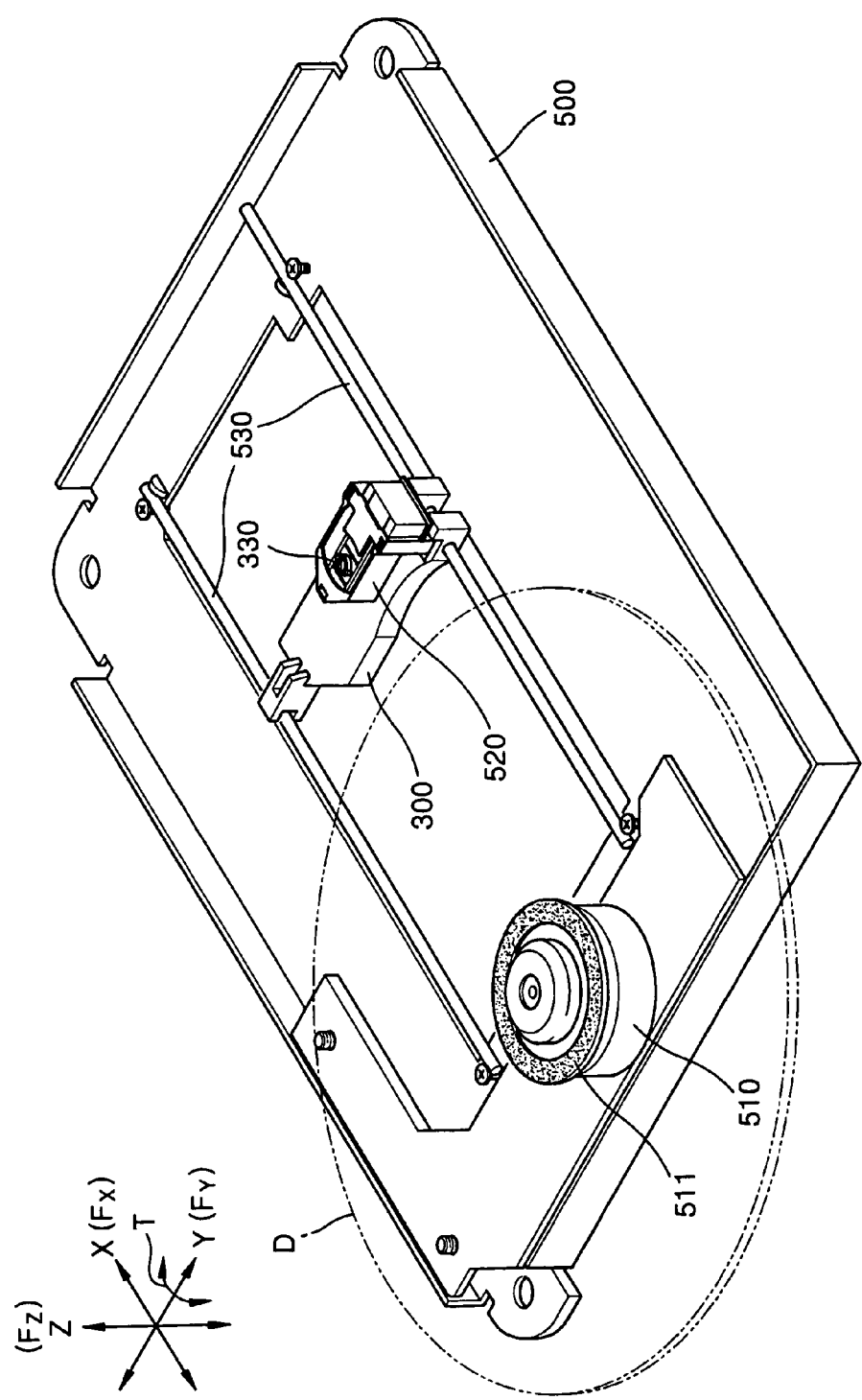
FIG. 1 is a perspective view of an optical disc drive, according to an embodiment of the present invention.
Figure 2:
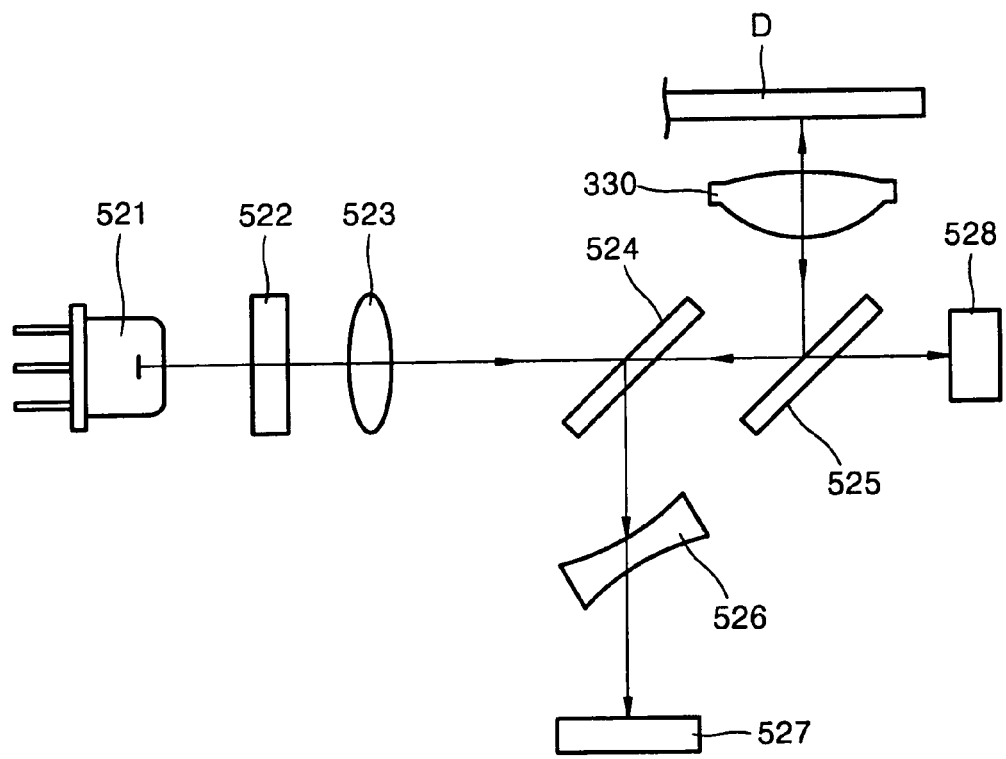
FIG. 2 schematically shows an example of an optical structure of an optical pickup unit of FIG. 1.

FIG. 1 is a perspective view of an optical disc drive according to an embodiment of the present invention. FIG. 2 schematically shows an example of an optical structure of an optical pickup unit of FIG. 1.

Referring to FIG. 1, a main frame 500 includes a spindle motor 510 which rotates an optical disc D. In addition, an optical pickup unit 520 is mounted on a base 300 that moves with respect to the optical disc D, and writes/reproduces information on/from the optical disc D. As shown in FIG. 1, the base 300 is supported by a pair of guide shafts 530, which are installed along a radial direction of the optical disc D such that the base 300 is slid along such a radial direction in the main frame 500.

The spindle motor 510 rotates the optical disc D, and a turntable 511 on which the optical disc D is mounted is coupled to a rotational shaft of the spindle motor 510. The optical pickup unit 520 radiates light on the optical disc D through an objective lens 330 disposed on the base 300 and writes information on the optical disc D and reproduces the information written on the optical disc D.

Referring to FIG. 2, the optical pickup unit 520 includes an optical module 521 which radiates light having a predetermined wavelength. In addition, a grating 522 separates light from the optical module 521 into a central light beam and side light beams. A collimating lens 523 collimates divergent light emitted from the optical module 521. The objective lens 330 forms light as light spot(s) on a recording surface of the optical disc D. A main photodetector 527 receives light reflected from the recording surface of the optical disc D and detects an information signal and an error signal.

A beam splitter 524 directs light emitted from the optical module 521 to the objective lens 330 and directs light reflected from the optical disc D to the main photodetector 527. A concave lens 526 may be disposed between the beam splitter 524 and the main photodetector 527 to remove astigmatism.

Another beam splitter 525 directs a portion of light energy from the optical module 521 to a front photodetector 528. The front photodetector 528 detects power of such light energy. When such power is less than or greater than a predetermined level, the power of the optical module 521 is adjusted so that light having power within an acceptable range is incident on the optical disc D.

FIG. 2 shows just an example structure of the optical pickup unit 520, and the present invention may be practiced with other structures of the optical pickup unit 520.

Referring to FIGS. 1 and 2, to precisely direct light from the optical module 521 onto the desired position on the optical disc D, the positional alignment of the objective lens 330 is desired to be controlled in a focusing direction Z and a tracking direction X, and as occasion demands, in a tilting direction T. To this end, a unit for driving the objective lens 330, referred to as an optical pickup actuator, is placed in the optical disc drive.

Figure 3:
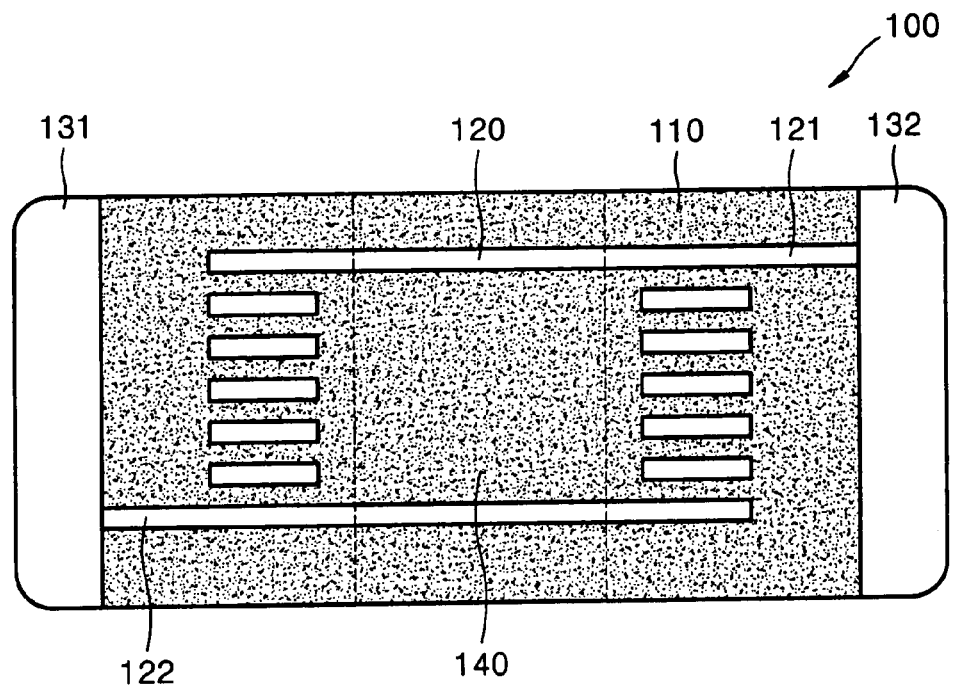
FIG. 3 is a vertical cross-sectional view of a molded coil device, according to an embodiment of the present invention.

The optical pickup actuator according to an embodiment of the present invention uses at least one molded coil device having a plurality of non-planar turns of a conductive material buried in an insulating and nonmagnetic body. FIG. 3 is a vertical cross-sectional view of a molded coil device according to an embodiment of the present invention.

Referring to FIG. 3, a molded coil device 100 includes a body 110 and a molded coil 120 buried in the body 110. In one embodiment of the present invention, the coil 120 has a rectangular shape from a horizontal view, similar to any of the coils 220, 230, and 240 in FIG. 4. However, the present invention may also be practiced when the coil 120 has other shapes such as a trapezoidal shape.

Each of two terminals 131 and 132 is electrically connected to a respective one of the ends 121 and 122 of the coil 120. The two terminals 131 and 132 are disposed at two sides of the body 110 in the example embodiment of FIG. 3. An electrical insulating and nonmagnetic material, such as glass or ceramic powder, is used for the body 110 in one example embodiment of the present invention. In addition, an opening 140 may be formed through a center of the coil 120, shown by a dotted line in FIG. 3. The present invention may be practiced with or without the opening 140 formed through the center of the coil 120.

Figure 4:
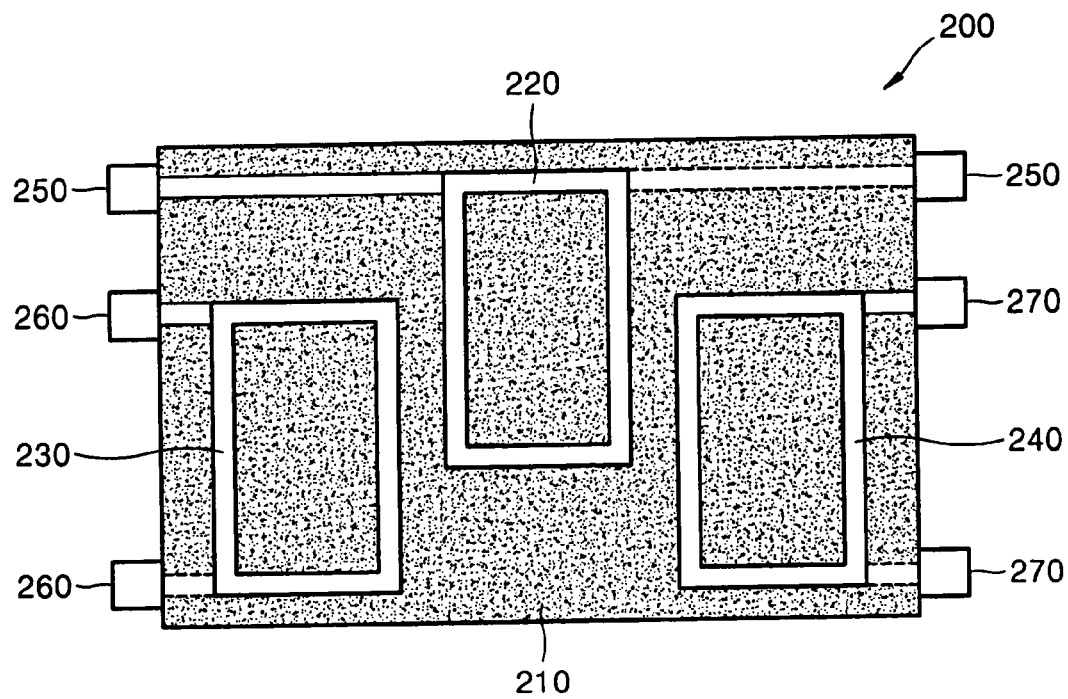
FIG. 4 is a horizontal cross-sectional view of a molded coil device, according to another embodiment of the present invention.

FIG. 4 is a horizontal cross-sectional view of a molded coil device 200 according to another embodiment of the present invention. Referring to FIG. 4, the molded coil device 200 includes a body 210 and three rectangular molded coils 220, 230, and 240 formed in the body 210. Each of the coils 220, 230, and 240 is formed separately and is electrically connected to a pair of terminals 250, 260, and 270, respectively.

The molded coil devices 100 and 200 may be manufactured using a manufacturing method of a chip inductor or a chip bead. A chip bead in general is a circuit element for a surface mounting device (SMD). Generally, since a chip inductor or a chip bead is used to generate an inductance in an electrical circuit, the chip inductor is manufactured by a stacking method, and the chip bead is manufactured by a sintering method, according to embodiments of the present invention.

Figure 5:
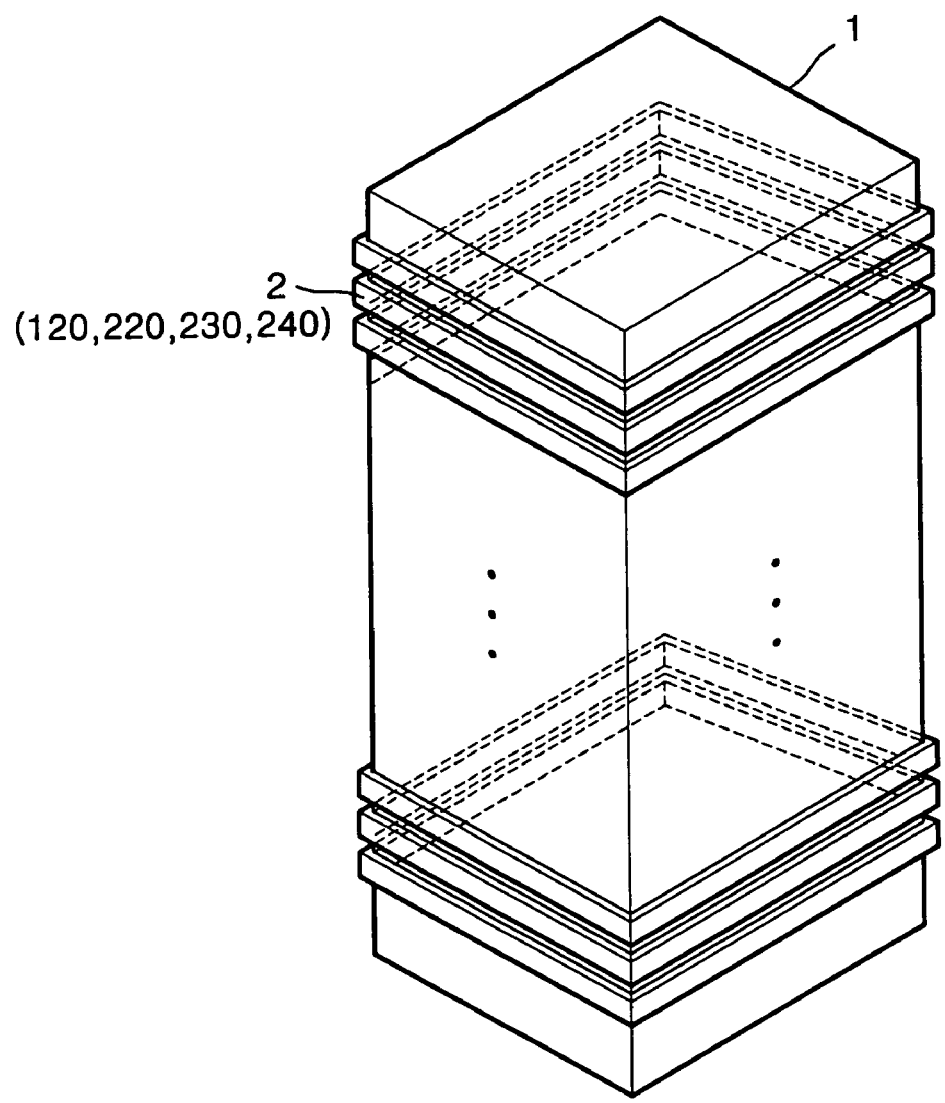
FIG. 5 illustrates formation of a chip bead-type molded coil device, according to an embodiment of the present invention.

FIG. 5 illustrates formation of a chip bead-type molded coil device 100. Referring to FIG. 5, a base 1 having a rectangular shape is formed. A conductor 2 is wound in a spiral shape around the external sides of the base 1. After that, the base 1 is removed, and only the conductor 2 is put in an insulating and nonmagnetic material and is sintered or pressed to form the integral body 110. In this manner, referring to FIGS. 3 and 5, the conductor 2 forms the coil 120, and the insulating and nonmagnetic powder material that has been sintered/pressed with the wound conductor 2 forms the integral body 110. In one embodiment of the present invention, the molded coil 120 is completely buried within the insulating and nonmagnetic powder material of the integral body 110 such that the coil 120 is not exposed.

Alternatively, both the conductor 2 and the base 1 are put in the insulating and nonmagnetic power material to be sintered or pressed together. In that example case, the insulating/nonmagnetic power is used to form the base 1. A plurality of conductors 2 or a plurality of bases 1 with a corresponding conductor formed thereon, are put in the insulating and nonmagnetic power material and are sintered or pressed together to form the molded coil device 200 with the plurality of molded coils 220, 230, and 240.

A conductive wire is wound around the outer circumference of the base 1 in one example embodiment of the present invention. Alternatively, a conductive material is deposited and patterned in a spiral pattern around the side surfaces of the base 1 using a chemical vapor deposition (CVD) process, in another example embodiment of the present invention. The CVD process for forming the conductor 2 is advantageous for patterning smaller dimensions of the conductor 2 so as to increase the number of turns of the conductors 2 while retaining a small size of the molded coil device.

Figure 6:
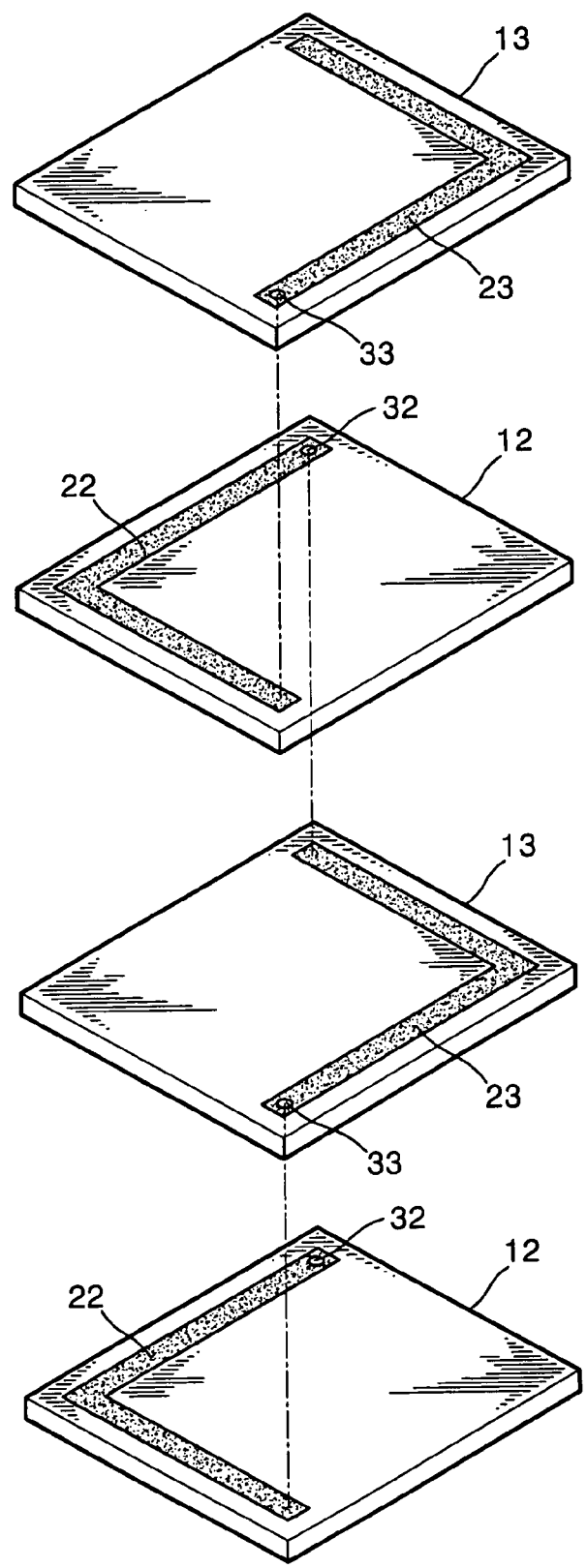
FIG. 6 illustrates formation of a chip inductor-type molded coil device, according to an embodiment of the present invention.

FIG. 6 illustrates formation of a chip inductor-type molded coil device 100. Referring to FIG. 6, a conductive pattern 22 having two rectangular sides is formed in an insulating sheet 12. A via hole 32 is formed on one end of the conductive pattern 22. Another conductive pattern 23 including the other two sides of the rectangle is formed in an insulating sheet 13. A via hole 33 is formed on one end of the conductive pattern 23. An electrical insulating and nonmagnetic material is used to form the insulating sheets 12 and 13. Since the conductive patterns 22 and 23 are formed using an optical printing method, the conductive patterns 22 and 23 are formed to have a precise shape.

By stacking the insulating sheets 12 and 13 on each other, the conductive patterns 22 and 23 are electrically connected to have a spiral conductive path via the via holes 32 and 33. By stacking the insulating sheets 12 and 13 on each other alternately and repeatedly, the molded coil device 100 having the coil 120 buried in the body 110 is formed. The insulating sheets 12 and 13 are alternately and repeatedly stacked on each other and then pressed or sintered together to form an integral body 110. In addition, in one example embodiment of the present invention, each of the conductive patterns 22 and 23 is completely buried within the respective sheet 12 and 13 such that the coil 120 is completely buried within the insulating and nonmagnetic powder material of the body 110 with the coil 120 not being exposed.

Figure 7:
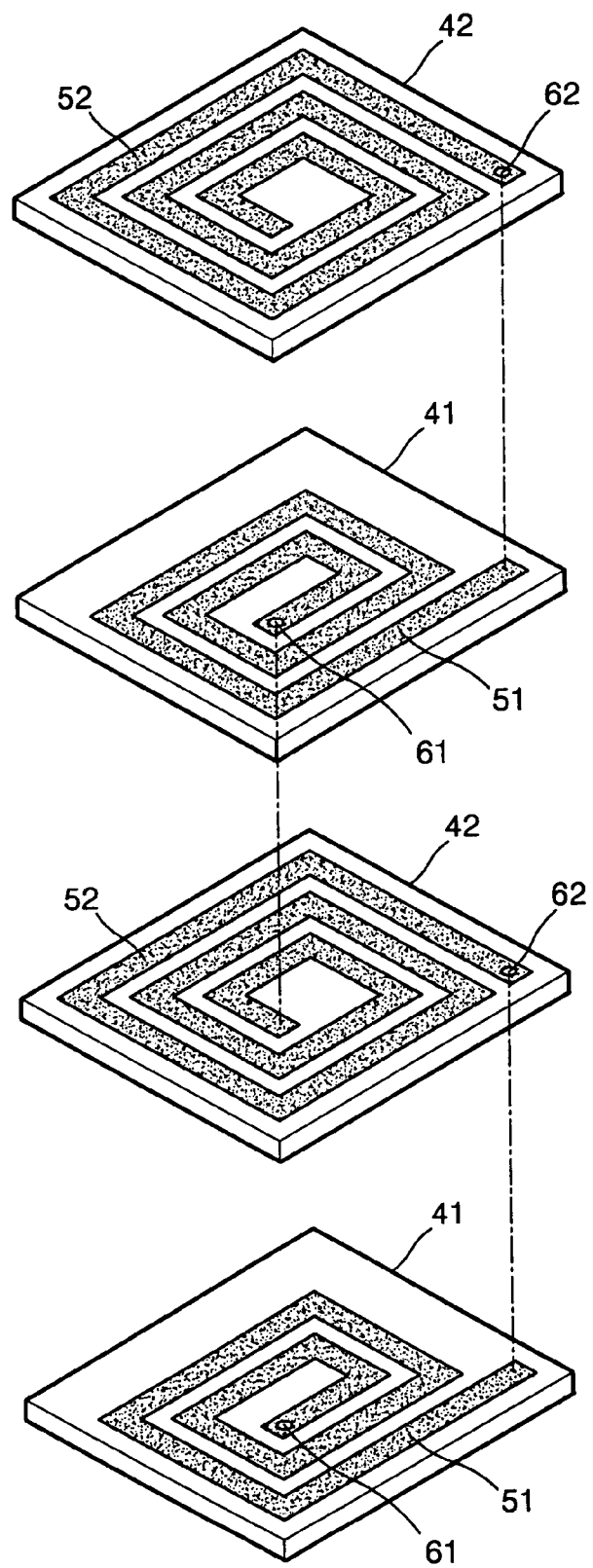
FIG. 7 illustrates formation of the chip inductor-type molded coil device, according to another embodiment of the present invention.

The conductive patterns 22 and 23 used to form the coil 120 may be patterned in a variety of shapes. FIG. 7 schematically shows an example of forming a chip inductor-type molded coil device with alternative shapes of conductive patterns.

Referring to FIG. 7, a conductive pattern 51 having a planar rectangular spiral shape wound from an outer edge toward a center of an insulating sheet 41 is patterned, and a via hole 61 is formed on a central end of the conductive pattern 51. Another conductive pattern 52 having another planar rectangular spiral shape wound from a center of an insulating sheet 42 toward an outer edge is patterned, and a via hole 62 is formed on an outer end of the conductive pattern 52.

By alternately and repeatedly stacking the insulating sheets 41 and 42 on each other, the conductive patterns 51 and 52 are electrically connected through the insulating sheets 41 and 42 via the via holes 61 and 62. With such a plurality of windings 51 and 52 in each of the sheets 41 and 42, the number of turns of the molded coil formed from the conductive patterns 51 and 52 is further increased.

The insulating sheets 41 and 42 are alternately and repeatedly stacked on each other and then pressed or sintered together to form an integral body. In addition, in one example embodiment of the present invention, each of the conductive patterns 51 and 52 is completely buried within the respective sheet 41 and 42 such that the resulting coil is completely buried within the insulating and nonmagnetic powder material of the body with the coil not being exposed.

Figure 8:
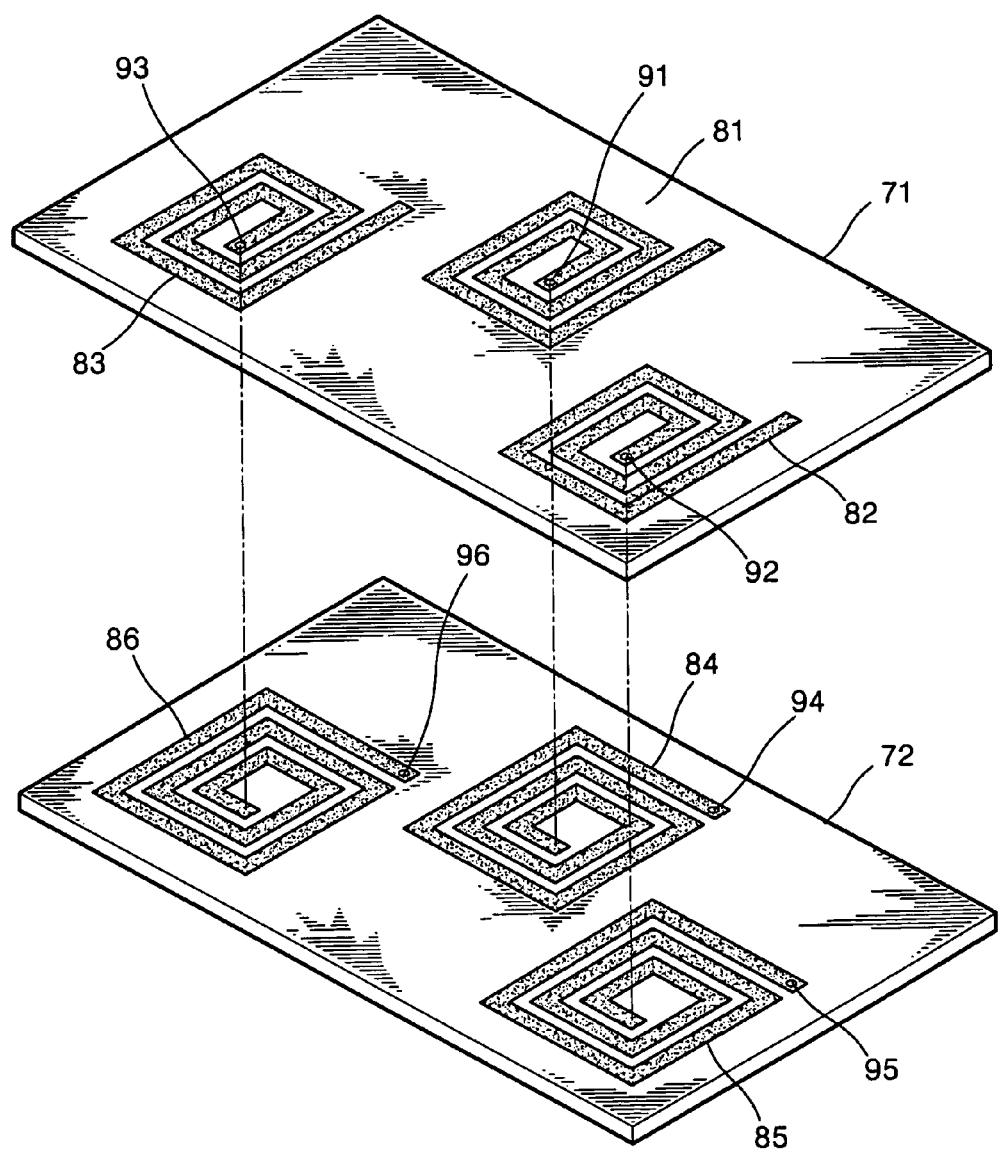
FIG. 8 illustrates formation of the chip inductor-type molded coil device, according to another embodiment of the present invention.

FIG. 8 illustrates formation of a chip inductor-type molded coil device according to yet another embodiment of the present invention.

Referring to FIG. 8, each of conductive patterns 81, 82, and 83 having a planar rectangular spiral shape wound from an outer portion toward a center portion of an insulating sheet 71 is patterned. Via holes 91, 92, and 93 are formed on a respective central end of the conductive patterns 81, 82, and 83, respectively.

Each of additional conductive patterns 84, 85, and 86 having a planar rectangular spiral shape wound from a center portion toward an outer portion of an insulating sheet 72 is patterned. Via holes 94, 95, and 96 are formed on an outer end of the conductive patterns 84, 85, and 86, respectively.

By alternately and repeatedly stacking the insulating sheets 71 and 72 on each other, the conductive patterns 81 and 84 are electrically connected via the via holes 91 and 94 to form a first molded coil (such as 220 of FIG. 4). In addition, the conductive patterns 83 and 86 are electrically connected via the via holes 93 and 96 to form a second molded coil (such as 230 of FIG. 4). Furthermore, the conductive patterns 82 and 85 are electrically connected via the via holes 92 and 95 to form a third molded coil (such as 240 of FIG. 4).

The insulating sheets 71 and 72 form a body having such molded coils buried therein and are comprised of an electrical insulating and nonmagnetic material. The insulating sheets 71 and 72 are alternately and repeatedly stacked on each other and then pressed or sintered together to form an integral body. In addition, in one example embodiment of the present invention, each of the conductive patterns 81, 82, and 83 are completely buried within the insulating sheet 71, and each of the conductive patterns 84, 85, and 86 are completely buried within the insulating sheet 72. Thus, the resulting coils are completely buried within the insulating and nonmagnetic powder material of the body with the coils not being exposed.

In this manner, since a pressing/sintering process is performed when manufacturing the chip bead-type or the chip inductor-type molded coil device, the conductive material forming the coil does not come off from a substrate, in contrast to a flat coil patterned on a PCB. In addition, the molded coil device having any of the above structures has good characteristics from a low frequency region to a high frequency region.

Furthermore, the conductive patterns 81, 82, 83, 84, 85, and 86 each have turns wound in an insulating sheet a plurality of times so that the number of turns of the coils is further increased. In contrast to the present invention, a conventional flat coil has a coil pattern formed from chemical etching processes for manufacturing a PCB, and thus the conventional flat coil has rounded corners. However, according to the chip inductor-type molded coil device of the present invention, since a conductive pattern is patterned using optical printing, each side of the pattern is substantially linear, and a corner part in which two sides intersect is substantially perpendicular.

Figure 9:
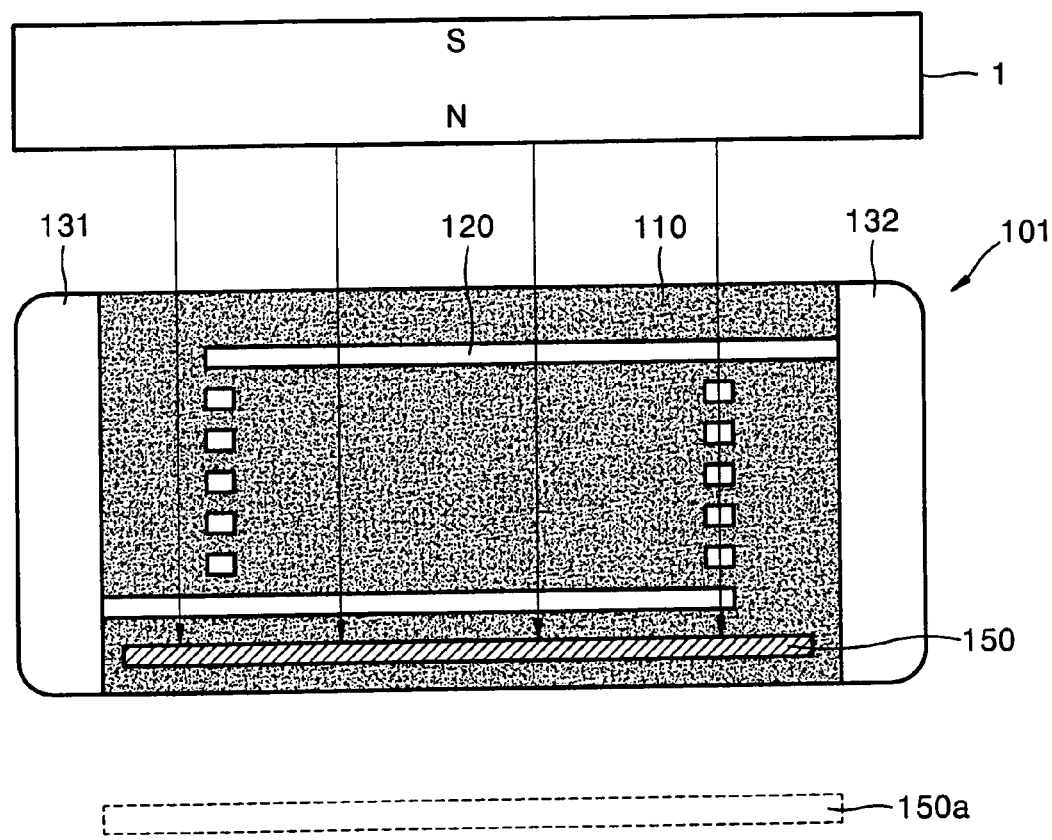
FIGS. 9 and 10 are respectively a vertical cross-sectional view and a horizontal cross-sectional view of a molded coil device, according to an embodiment of the present invention.
Figure 10:
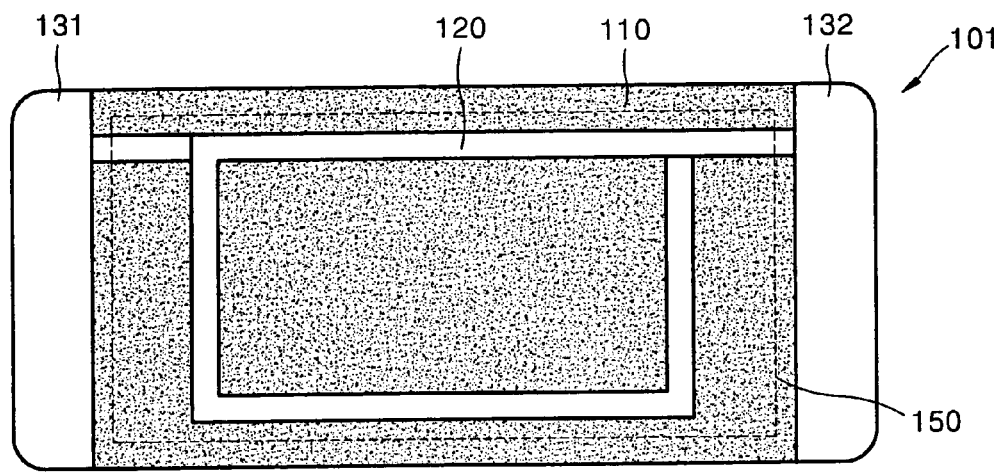

FIGS. 9 and 10 are respectively a vertical cross-sectional view and a horizontal cross-sectional view of a molded coil device according to another embodiment of the present invention.

Referring to FIG. 9, a molded coil device 101 includes a back yoke 150 in addition to the coil 120 buried in the body 110. Note that the molded coil device 101 in FIG. 9 is similar to that 100 of FIG. 3 except with the additional back yoke 150, and the back yoke 150 is shown outlined in dashed lines in the horizontal cross sectional view of FIG. 10. The back yoke 150 is comprised of a magnetic material such as a ferromagnetic material for example such that the magnetic flux generated by a magnet 1 is perpendicular to the coil 120. Terminals 131 and 132 for supplying a current to the coil 120 are disposed at two sides of the body 110.

The coil 120 and the back yoke 150 are buried in the body 110 formed of an insulating and nonmagnetic material. A distance between the coil 120 and the back yoke 150 is desired to be small. As illustrated in FIG. 9, if an electromagnetic force is induced from the magnetic force of the magnet 1 and the current flowing through the coil 120, the coil 120 and the yoke 150 move together within the molded coil device 101.

On the other hand as illustrated by the dotted lines of FIG. 9, if a yoke 150a were not formed within the molded coil device 101 by being spaced by a predetermined gap apart from the body 110, the molded coil device 101 with only the coil 120 moves. Thus, the yoke 150a does not move, and the intensity of the magnetic field reaching the yoke 150a varies according to the position of the coil 120 such that the total force acting on the coil 120 becomes unbalanced with potential undesired rotational moment in the coil 120. Furthermore, an eddy current that disturbs the magnetic field is induced in the yoke 150a, and has a negative effect on controlling the operation of the coil 120.

In contrast, since the back yoke 150 of the present invention moves together with the coil 120 within the body 110, when the size of the magnet 1 is sufficiently larger than the size of the coil 120, the intensity of the magnetic field of the magnet 1 which acts on the back yoke 150 hardly varies. Accordingly, the effective length of the coil 120 is enhanced, and creation of a rotational moment in the coil 120 is limited.

In addition, when the shape of the back yoke 150 is a stack shape or a loop shape, eddy current that has a negative effect on controlling the operation of the coil 120 may be reduced.

FIGS. 11 through 14 show modifications of a yoke within a molded coil device according to alternative embodiments of the present invention. The same elements as those of FIGS. 9 and 10 are denoted by the same reference numerals, and descriptions thereof will be omitted.

Figure 11:
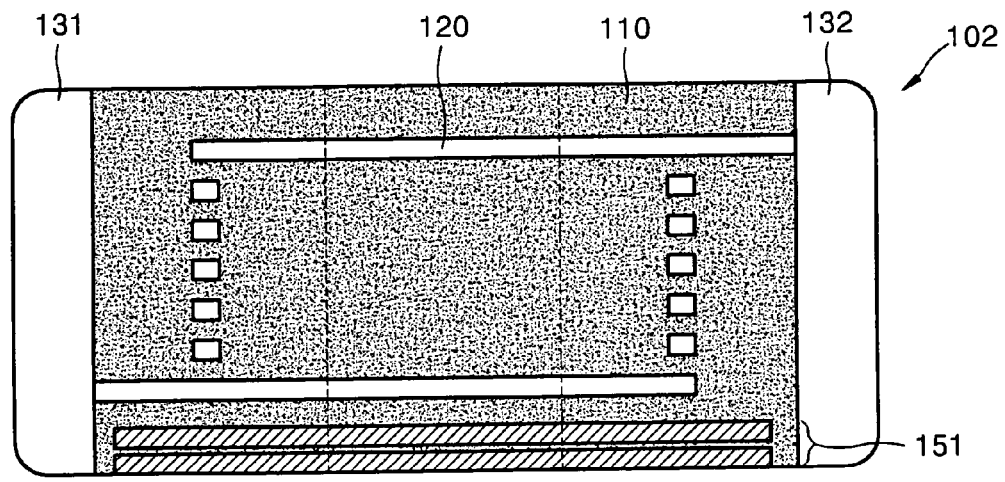
FIGS. 11 through 14 each illustrate a respective yoke incorporated into the molded coil device in alternative embodiments of the present invention.
Figure 12:
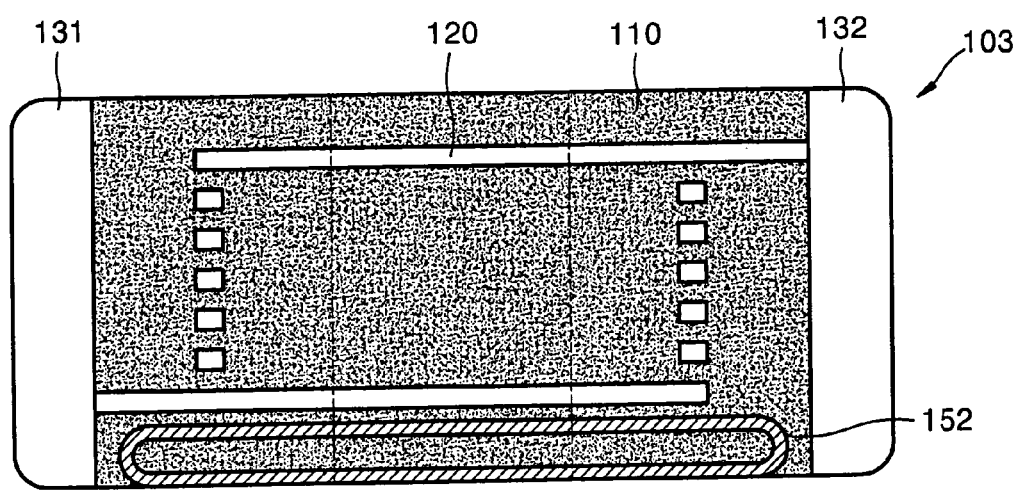

FIGS. 11 and 12 show modifications of a yoke for reducing a negative effect caused by an eddy current. Referring to FIG. 11, a molded coil device 102 includes a stack yoke 151. Referring to FIG. 12, a molded coil device 103 includes a loop yoke 152. The stack yoke 151 is formed with two or more thin flat yokes stacked within the body 110. The stack yoke 151 reduces the loss in the magnetic flux of the magnet 1 due to an eddy current and thus enhances magnetic efficiency. The loop yoke 152 increases a saturation magnetic flux of the magnet 1 and thus enhances the magnetic efficiency.

Figure 13:
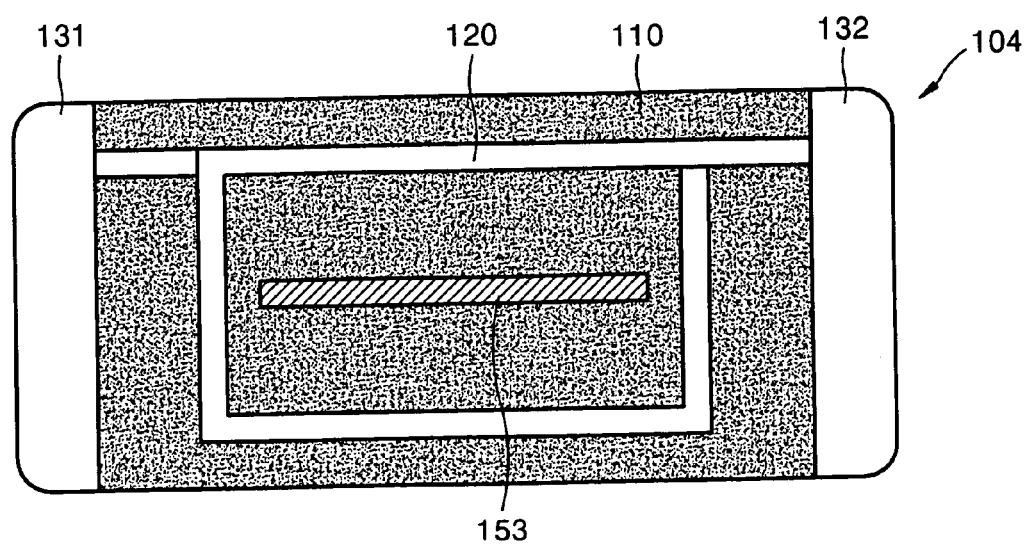
Figure 14:
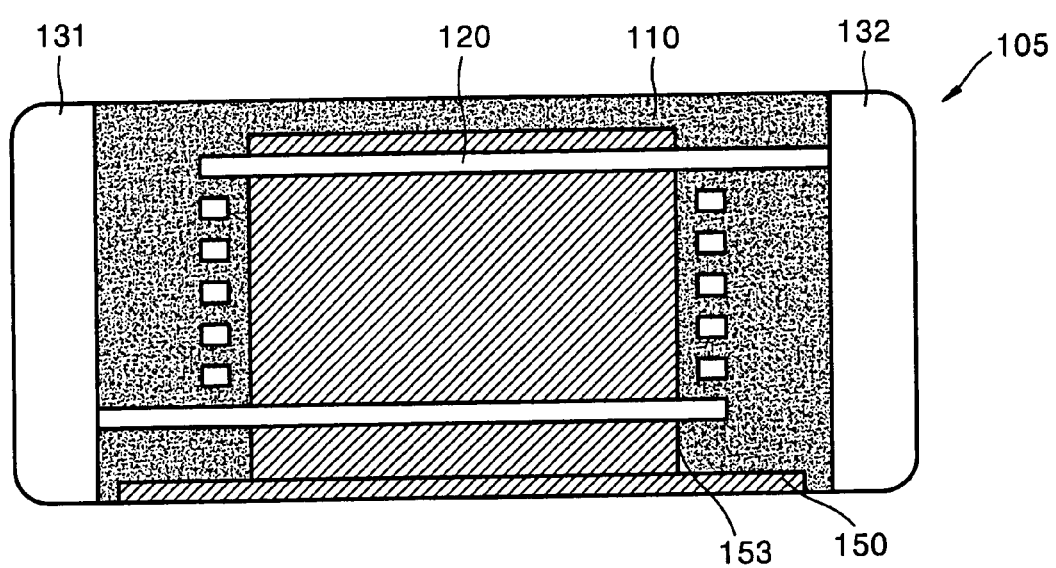

In addition, as shown in FIGS. 13 and 14, depending on the interaction between the coil 120 and the magnet 1, molded coil devices 104 and 105 comprise an inner yoke 153 and a back yoke 150, according to another embodiment of the present invention. FIG. 13 shows a horizontal cross-sectional view, and FIG. 14 shows a vertical cross-sectional view. The inner yoke 153 and the back yoke 150 may each be the stack yoke 151 or the loop yoke 152 shown in FIGS. 11 and 12. The inner yoke 153 increases an inductance and enhances the sensitivity of the actuator having the molded coil device.

Figure 15:
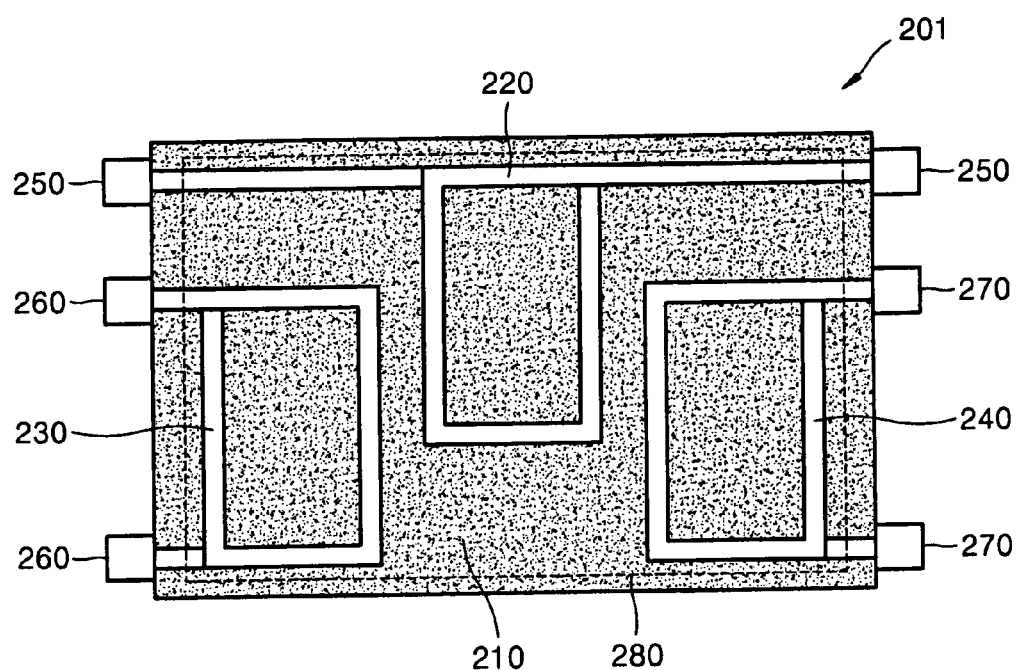
FIG. 15 is the horizontal cross-sectional view of the molded coil device of FIG. 4 with an additional yoke, according to another embodiment of the present invention.
Figure 16:
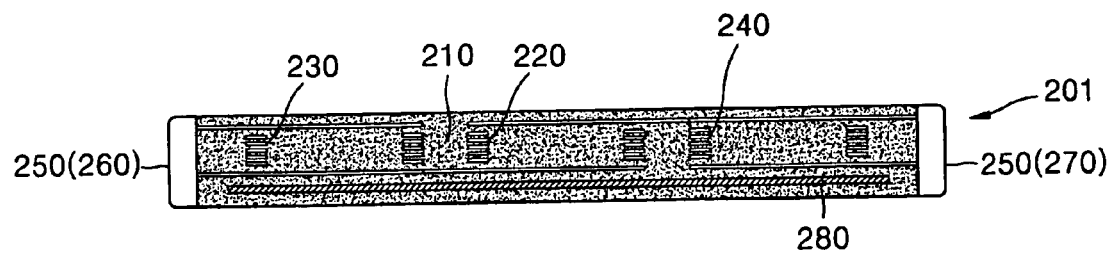
FIG. 16 is a vertical cross-sectional view of FIG. 15.

FIG. 15 is the horizontal cross-sectional view of the molded coil device of FIG. 4 with an additional yoke 280 to form a molded coil device 201 according to another embodiment of the present invention, and FIG. 16 is a vertical cross-sectional view of FIG. 15.

The back yoke 280 is provided at one side of the respective coils 220, 230, and 240. The yoke 280 may be the stack yoke 151 or the loop yoke 152, as shown in FIGS. 11 and 12. A direction of the respective current applied to each of the coils 220, 230, and 240 is controlled such that the position of the molded coil device 201 is controlled three-dimensionally.

An optical pickup actuator using at least one of the molded coil devices above is now described.

Figure 17:
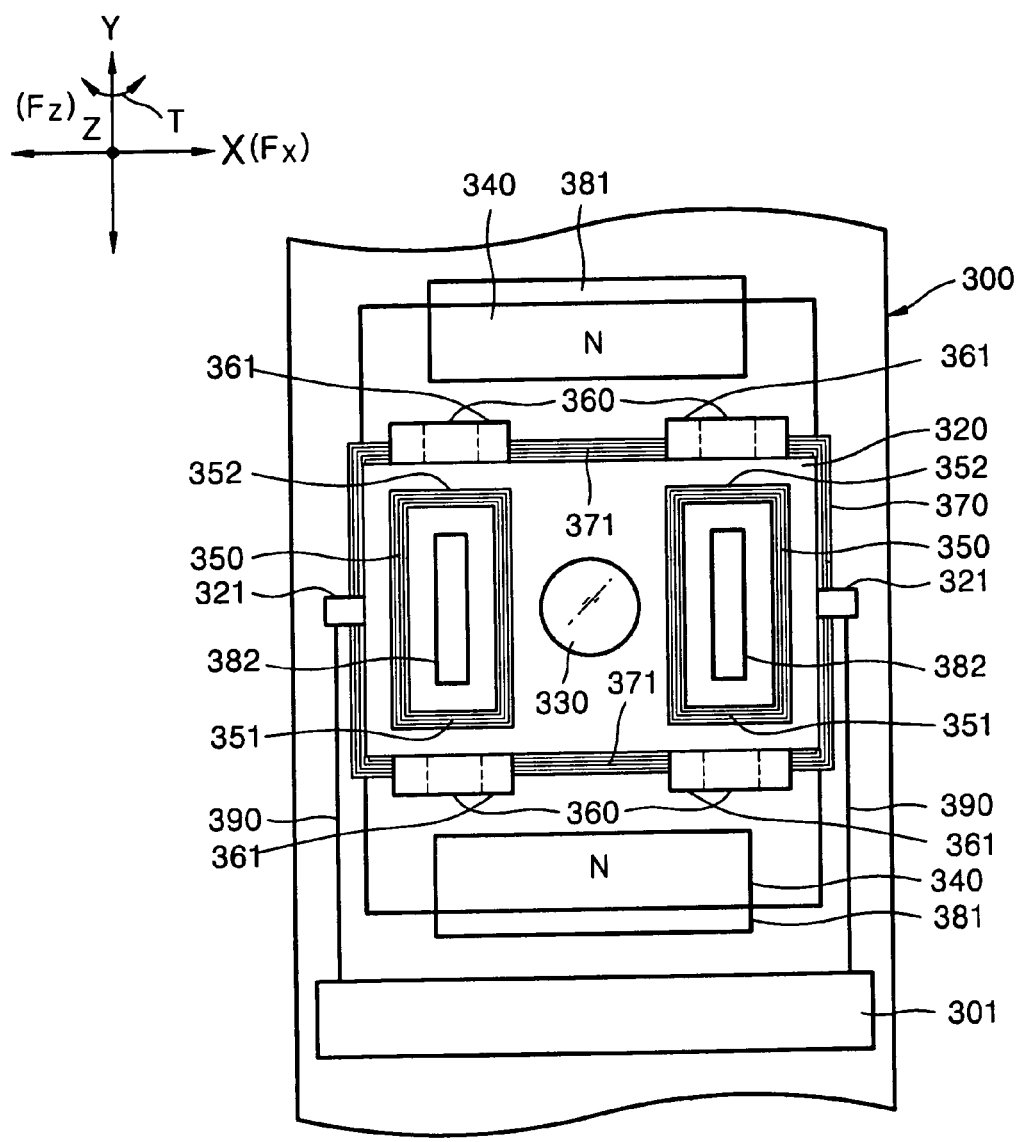
FIG. 17 is a plan view of an optical pickup actuator having a plurality of molded coils each with the structure of FIG. 3, according to an embodiment of the present invention.

FIG. 17 is a plan view of an optical pickup actuator using such molded coil devices according to an embodiment of the present invention. Referring to FIG. 17, the optical pickup actuator includes the base 300 and a blade 320 on which the objective lens 330 is mounted.

A plurality of yokes 381 and 382 and a pair of magnets 340 which provide a magnetic force, are disposed on the base 300. The magnets 340 are installed so that the N poles face each other.

A holder 301 is disposed on the base 300. A plurality of hinges 321 are disposed on the blade 320. One end of each of a plurality of suspension wires 390 is connected to the holder 301, and the other end thereof is connected to a respective one of the hinges 321 so that the blade 320 is elastically and movably supported in the base 300.

A plurality of molded coil devices which generate an electromagnetic force by an interaction with the magnets 340 is installed on the blade 320. There are three example cases of the optical pickup actuator: a) the optical pickup actuator including focusing coils and tracking coils, b) the optical pickup actuator including focusing coils and tracking coils with the focusing coils also serving as tilting coils, and c) the optical pickup actuator including focusing coils, tracking coils, and tilting coils. In the present embodiment, the optical pickup actuator of case c) is now described.

Referring to FIG. 17, tilting coils 350, tracking coils 360, and a focusing coil 370 are disposed on the blade 320. Each of the tilting coils 350, the tracking coils 360, and the focusing coil 370 is implemented similar to the molded coil device 100 of FIG. 3, in one embodiment of the present invention. In this case, a molded coil device 100 of FIG. 3, in which the hollow 140 into which the yoke 382 is inserted, is used as each of the tilting coils 350. In addition, a molded coil device 100 of FIG. 3 having the hollow 140 into which the blade 320 is inserted, is used as the focusing coil 370.

In one embodiment of the present invention, a molded coil device 100 of FIG. 3 with the hollow 140 (shows with dashed lines in FIG. 17) is used as each of the tracking coils 360 to reduce the weight of the tracking coils 360. Note that the tilting coils 350 and the focusing coil 370 are each installed with the hollows 140 facing up from the base 300 while the tracking coils 360 are installed with the hollow 140 facing the magnets 340. The blade 320 is manufactured using plastic molding. In an example embodiment of the present invention, the tilting coils 350, the tracking coils 360, and the focusing coil 370 are formed as a single body with the blade 320 using insert molding such that the coils 350, 360, and 370 are buried within the blade 320.

The tilting coils 350 are installed toward an upper side of the blade 320 or through the blade 320, symmetrical with the objective lens 330 in the horizontal direction. The two sides 351 and 352 of the tilting coils 350 facing the magnet 340 are predominantly used for generating an electromagnetic force, in an example embodiment of the present invention. A respective electromagnetic force Fz in opposite directions is generated in each of the right and left tilting coils 350 in a Z-direction so that the position of the blade 320 is controlled in the tilting direction T.

The tracking coils 360 are used to generate an electromagnetic force Fx in a tracking direction X by an interaction with the magnets 340. The tracking coils 360 are installed vertically at two sides of the blade 320 each with the respective hollow facing the magnets 340. As occasion demands, the tracking coils 360 may be installed at just one of the two sides. The inner sides 361 of the tracking coils 360 are used for generating an electromagnetic force in this example embodiment of the present invention.

The focusing coil 370 is installed horizontally to surround the blade 320. Two sides 371 facing the magnets 340 are used for generating an electromagnetic force in this example embodiment of the present invention. An electromagnetic force Fz is generated by the two sides 371 in the Z-direction so that the blade 320 is driven in such a focusing direction.

Referring to FIG. 3, in the molded coil device 100, the coil 120 is completely buried in the body 110. Similarly, the coils 350, 360, and 370 are completely buried within the blade 320 in one aspect of the present invention. Thus, even as the blade 320 is moved and contacts the base 300 or the yoke 382, the coils 350, 360, and 370 are not short-circuited or damaged.

In the chip bead-type molded coil device of FIG. 5, the spiral conductor 2 is formed using CVD so that the number of turns of the coils 120 can be greatly increased without increasing the size of the molded coil device. Any of the coils 350, 360, and 370 may be formed as such a chip bead-type molded coil device of FIG. 5.

Alternatively, any of the coils 350, 360, and 370 may be formed according to the chip inductor-type molded coil device of FIGS. 6 and 7. In that case, the shape of an insulating sheet is varied so that the molded coil device having a variety of shapes according to the shape of the blade 320 is formed. In addition, the number of turns of the coils can be increased according to the number of stacked insulating sheets.

In addition, any of the coils 350, 360, and 370 may be formed as the molded coil devices described in any other embodiments of the present invention herein. For example, the molded coil device 104 of FIG. 13 may be used for each of the tilting coils 350. In that case, the inner yoke 153 is formed as a single body with the blade 320, and the separate yoke 382 is not used. In this embodiment, since the inner yoke 153 is moved together with a respective one of the coils 350, a variation in a magnetic field of the coils 350 can be minimized.

Figure 18:
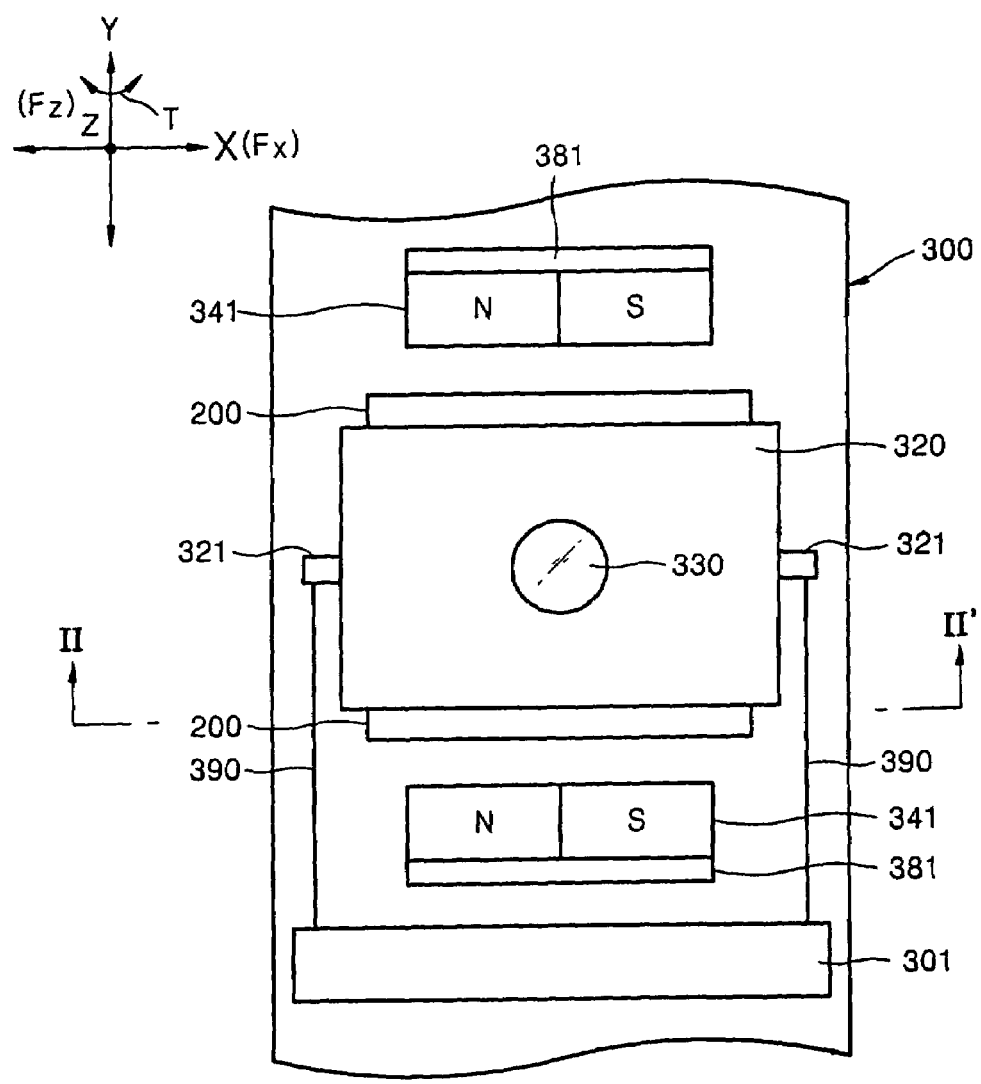
FIG. 18 is a plan view of an optical pickup actuator having the plurality of molded coils of FIG. 4, according to an embodiment of the present invention.
Figure 19:
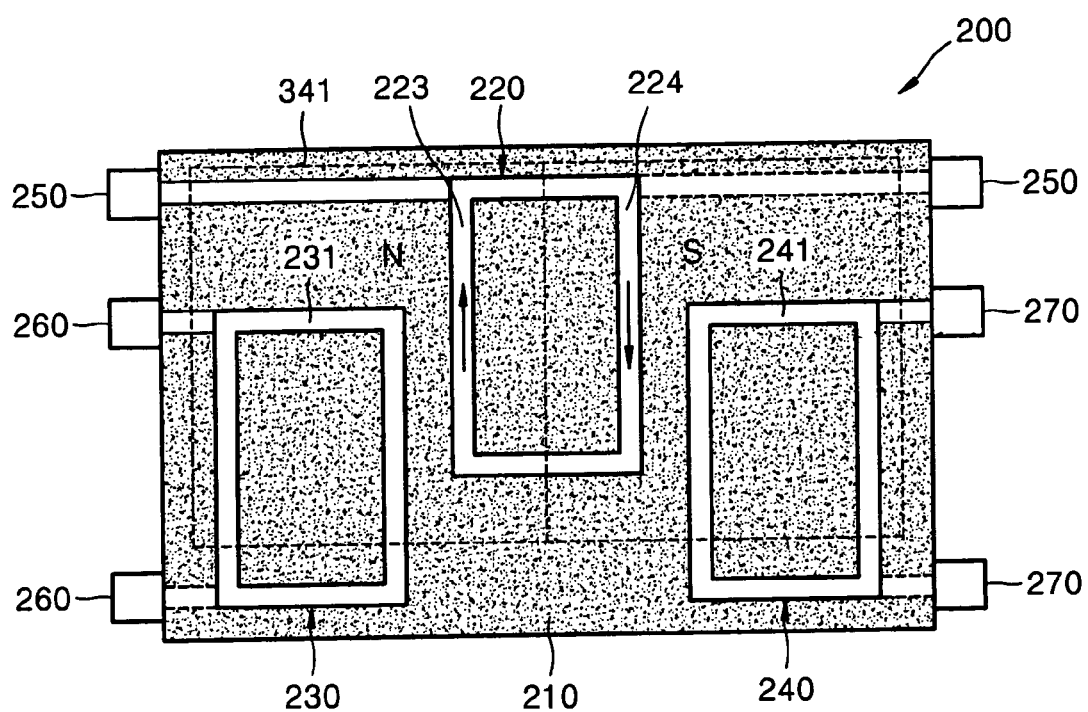
FIG. 19 is a cross-sectional view taken along line II-II' of FIG. 18.

FIG. 18 is a plan view of an optical pickup actuator having the molded coil device 200 of FIG. 4, according to an alternative embodiment of the present invention. FIG. 19 is a cross-sectional view taken along line II-II' of FIG. 18.

Referring to FIG. 18, the blade 320 is elastically and movably supported by the suspension wire 390 in the base 300. A pair of magnets 341 are disposed in the base 300 to face each other, and a respective yoke 381 is disposed behind each of the magnets 341. A pair of molded coil devices each similar to the molded coil 200 of FIG. 4 are disposed at the sides of the blade 320 facing the magnets 341. The molded coil devices 200 are formed as a single body with the blade 320 using insert molding in one embodiment of the present invention.

Referring to FIGS. 18 and 19, the coils 230 and 240 are used to drive the blade 320 in the focusing direction Z and the tilting direction T. Sides 231 and 242 of the coils 230 and 240, respectively, are used for generating an electromagnetic force. Thus, an N-pole and an S-pole of the magnet 341 are disposed toward the two respective sides 231 and 241. If current flows through the two sides 231 and 241 in the same direction, an electromagnetic force Fz in opposite directions is generated in the coils 230 and 240, and the position of the blade 320 is controlled in the tilting direction T. Alternatively, if current flows through the two sides 231 and 241 in opposite directions, an electromagnetic force Fz in one direction is generated in the coils 230 and 240 so that the position of the blade 320 is controlled in the focusing direction Z.

The coil 220 is used to drive the blade 320 in the tracking direction X with the right and left sides 223 and 224 used for generating an electromagnetic force. Thus, the N-pole and the S-pole of the magnet 341 are disposed toward the two sides 223 and 224, respectively. The direction of current flowing through the coil 220 is controlled so that the electromagnetic force Fx in the tracking direction X is generated.

Generally, the magnitude and direction of current flowing through each of the coils 220, 230, and 240 is adjusted for controlling desired position of the blade 320. Thus, the blade 320 is driven in the focusing direction Z, the tracking direction X, and the tilting direction T using the two molded coil devices 200 in the embodiment of FIG. 18.

Alternatively in the embodiment of FIG. 18, the molded coil device 201 of FIGS. 15 and 16 may be substituted for the molded coil devices 200. In that case, a yoke 280 is formed as a single body within each of the pair of the molded coil devices 201. The yokes 381 and 280 form a linear magnetic path through which the coils 220, 230, and 240 are disposed.

In this manner, any of the embodiments of the molded coil devices according to the present invention is used within an optical disc drive. However, other types of actuators which generate an electromagnetic force by an interaction with magnets may also use any of the molded coil devices of the present invention. Other example applications include a magnetic head driving unit of a hard disc drive and a pickup unit of a magneto-optical disc drive.

In summary, a molded coil device including at least one coil buried in an insulating and nonmagnetic body is used to drive a blade. A conductive material of the coil is formed into a plurality of turns that are electrically connected in a spiral-like path through a plurality of planes. The conductive material of the coil is substantially or completely buried within the insulating and nonmagnetic body.

Thus, even though the molded coil device contacts a base or a yoke, the coil that is substantially or completely buried within the body is not short-circuited or damaged, in one embodiment of the present invention. Second, for the molded coil device formed according to the chip bead-type or chip inductor-type methods, the number of turns of each coil is increased from the prior art without increasing the overall size of the molded coil device. Alternatively, for a same number of turns of a coil, the size of the coil can be minimized with the present invention.

Third, when the molded coil device is formed according to the chip inductor-type method, the shape of the insulating sheet is varied such that the molded coil device may be formed for a variety of shapes according to the shape of a blade. Thus, the blade may be formed with more variety of shapes.

Fourth, when the molded coil device is formed according to the chip bead-type or the chip inductor-type method, pressing/sintering is used to form a substantially integral body with the at least one coil being completely buried in the body such that the conductive material of the coil does not come off from the body.

Fifth, since any yoke and coil are formed to be contained within the body, the magnetic flux surrounding the coil is controlled to be more linear for more efficient magnetic usage. In addition, spacing between the magnet, the coil, and the yoke may be decreased without interference between the coil and the yoke for enhanced magnetic usage efficiency and driving sensitivity.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A molded coil device for an actuator, comprising:
   at least one coil comprised of a plurality of turns of a conductive material formed through a plurality of planes;
   an integral body comprised of an insulating and nonmagnetic material that buries the plurality of turns of the at least one coil; and
   a yoke buried within the integral body.

2. The molded coil device of claim 1, wherein the yoke is one of a stack yoke, a loop yoke, and an inner yoke.

3. An optical pickup actuator, comprising:
   a blade having an objective lens mounted thereon;
   a base having magnets disposed thereon, wherein the blade is movably coupled to the base; and
   a molded coil device installed on the blade for moving the blade by inducing an electromagnetic force from interaction with the magnets, the molded coil device comprising:
   a plurality of coils for driving the blade in at least a focus direction and a tracking direction, each of the plurality of coils having a respective plurality of turns of a conductive material; and
   an integral body comprised of an insulating and nonmagnetic material that buries the plurality of turns of the plurality of coils with all of the plurality of coils that drive the blade in at least the focus and tracking directions being buried in the one single integral body.

4. The optical pickup actuator of claim 3, wherein the body is formed to be integral with the blade.

5. The optical pickup actuator of claim 3, further comprising:
   a yoke buried within the integral body.

6. The optical pickup actuator of claim 5, wherein the yoke is one of a stack yoke, a loop yoke, and an inner yoke.

7. The optical pickup actuator of claim 3, further comprising:
   terminals, each coupled to an end of a coil and each formed onto a side of the integral body.

8. An optical pickup unit comprising:
an optical module;
an objective lens that forms light emitted from the optical module as at least one light spot on an optical disc; and
an optical pickup actuator, comprising:
a blade having the objective lens mounted thereon;
a base having magnets disposed thereon, wherein the blade is movably coupled to the base, and wherein the base moves with respect to the optical disc for writing/reproducing information on/from various locations of the optical disc; and
a molded coil device formed on the blade for moving the blade by inducing an electromagnetic force from interaction with the magnets, the molded coil device comprising:
a plurality of coils for driving the blade in at least a focus direction and a tracking direction, each of the plurality of coils having a respective plurality of turns of a conductive material; and
an integral body comprised of an insulating and nonmagnetic material that buries the plurality of turns of the plurality of coils with all of the plurality of coils that drive the blade in at least the focus and tracking directions being buried in the one single integral body.

9. The optical pickup unit of claim 8, wherein the molded coil device further comprises:
a yoke buried within the integral body.

10. The optical pickup unit of claim 9, wherein the yoke is one of a stack yoke, a loop yoke, and an inner yoke.

11. An optical disc drive comprising:
a spindle motor that rotates an optical disc; and
an optical pickup unit including:
an optical module;
an objective lens that forms light emitted from the optical module as at least one light spot on the optical disc; and
an optical pickup actuator, comprising:
a blade having the objective lens mounted thereon;
a base having magnets disposed thereon, wherein the blade is movably coupled to the base, and wherein the base moves with respect to the optical disc for writing/reproducing information on/from various locations of the optical disc; and
a molded coil device formed on the blade for moving the blade by inducing an electromagnetic force from interaction with the magnets, the molded coil device comprising:
a plurality of coils for driving the blade in at least a focus direction and a tracking direction, each of the plurality of coils having a respective plurality of turns of a conductive material; and
an integral body comprised of an insulating and nonmagnetic material that buries the plurality of turns of the plurality of coils with all of the plurality of coils that drive the blade in at least the focus and tracking directions being buried in the one single integral body.

12. The optical disc drive of claim 11, wherein the molded coil device further comprises:
a yoke buried within the integral body.

13. The optical disc drive of claim 12, wherein the yoke is one of a stack yoke, a loop yoke, and an inner yoke.

14. The molded coil device of claim 1, further comprising:
a plurality of coils, each having a plurality of turns of the conductive material buried within the integral body.

15. The molded coil device of claim 1, wherein the molded coil device is of a chip inductor-type formed from a plurality of stacked insulating sheets each having a conductive pattern and via holes for coupling the conductive patterns of adjacent insulating sheets such that the coupled conductive patterns form the coil, and wherein the plurality of sheets are formed into the integral body.

16. The molded coil device of claim 1, wherein the molded coil device is of a chip bead-type formed from a wire being wound around a base, and from the wound wire being sintered/pressed with the insulating and nonmagnetic material to form the integral body.

17. The molded coil device of claim 1, wherein the molded coil device is of a chip bead-type formed from the conductive material being patterned into a spiral shape around a base using a CVD (chemical vapor deposition) process, and from the patterned conductive material and the base being sintered/pressed with the insulating and nonmagnetic material to form the integral body.

18. The molded coil device of claim 1, further comprising:
terminals, each coupled to an end of a coil and each formed onto a side of the integral body.

* * * * *